Patented Aug. 12, 1947

2,425,535

UNITED STATES PATENT OFFICE 2,425,535

SEPARATION OF NORMAL PARAFFINS FROM ISO-PARAFFINS BY MEANS OF ACTIVATED COCOANUT CHARCOAL

Henry J. Hibshman, Plainfield, N. J., assignor to Standard Oil Development Company, a corporation of Delaware No Drawing. Application July 25, 1945, Serial No. 607,079

11 Claims. (Cl. 260—676)

This invention relates to a novel process of separating hydrocarbons, and to the resulting products, certain of which are particularly useful as high anti-knock motor fuels, or as blending agents for fuels. More particularly, it relates to a novel method of separating narrow boiling hydrocarbon fractions into relatively straight-chained compounds and other types such as relatively high branched compounds, by adsorbing the straight-chained ones on a type of adsorbent which has been found surprisingly effective and selective for this purpose.

Various suggestions have been made heretofore to separate hydrocarbon liquids or gases into different fractions by adsorbing one type or other on a solid adsorbent, such as some of the zeolites, e. g., chabasite, which is said to separate normal butane from isopentane or from a mixture of toluene and cyclohexane, and to separate normal heptane from toluene or from iso-octane. On the other hand, certain charcoals such as a birch charcoal activated with zinc chloride have been studied in regard to adsorption of olefins of various molecular weights, and have been found to adsorb normal hydrocarbons to a smaller extent than iso-compounds. Other disclosures and tests indicate that other substances classed as adsorbents are not at all active in separating one type of hydrocarbon from another in the same boiling range. It is apparent from the above considerations that the ability to adsorb selectively certain hydrocarbons from others of a similar boiling range is a unique and quite individualistic property, and apparently only a few special adsorbents are adapted to adsorb particularly the normal or straight-chained hydrocarbons which are poor in anti-knock properties, or may actually cause knocking of a motor fuel in an internal combustion engine, out of a mixture with highly branched hydrocarbons which are very high in anti-knock properties.

According to the present invention, it has been found that activated cocoanut charcoal selectively adsorbs normal hydrocarbons much more than iso-compounds, which is precisely the reverse of the activated birch charcoal mentioned above. The activated cocoanut charcoal used according to this invention is preferably made by activating cocoanut charcoal by oxidizing agents e. g. $CO_2$ and steam, etc.

The hydrocarbon liquids which may be advantageously separated according to this invention, are preferably hydrocarbons ranging from about 3 to 12 carbon atoms, and preferably about 6 to 10 carbon atoms. However, the hydrocarbon liquid starting material should first be separated into distillate fractions of a narrow boiling range, i. e. having a boiling point spread of less than about 200° F., and preferably less than 25° F. The invention applies particularly to the adsorption of normal paraffin hydrocarbons from other paraffin hydrocarbons which are relatively highly branched. For instance, normal heptane which has a boiling point of 209.2° F. is readily and quite selectively adsorbed from a mixture thereof with iso-octane (2,2,4-trimethyl pentane) which boils at 210.6° F. Other examples of mixtures which may be separated according to this invention include the adsorption of normal hexane or pentane out of a mixture thereof with branched hexane, or isopentane respectively. In addition to the separation of these binary mixtures composed of compounds of approximately the same boiling points, it is possible to separate the normal paraffin $C_5$ through $C_7$ from iso-octane and other highly branched paraffins with which they are associated. Any aromatics in the feed are absorbed along with the normal paraffins. Naphthenes may or may not be absorbed depending upon their structure. Although the invention is preferably carried out by treating the hydrocarbon feed in the liquid phase, it may also be applied to vapor phase operation.

The adsorption may be carried out at a temperature at about —60° F. to +285° F., preferably at about 32° F. to 125° F. Atmospheric pressure is preferably used, particularly in case of hydrocarbons which are normally liquid at atmospheric temperature, and super-atmospheric pressures may be used for hydrocarbons which are normally gaseous at atmospheric temperature, or even for higher boiling hydrocarbons, if it is desired to accelerate and/or increase the adsorption.

The yield, which may be expressed in several ways, preferably the volume of unadsorbed branched hydrocarbon compared to the volume of mixed hydrocarbon starting material, will of course vary with the proportionate volume of adsorbent in relation to the volume of hydrocarbon and according to the time of contact. Also, the extent of separation of the hydrocarbons or the extent of improvement in anti-knock properties (as measured for instance by ASTM octane number) will vary inversely with the per cent yield.

Generally, the amount of activated carbon to be used will range from about 100 to 1,000 lbs. per barrel of hydrocarbon feed (based on liquid feed operation), or expressed in other terms about 2 to 20 barrels, preferably about 4 to 10 barrels, of liquid hydrocarbon feed may be treated with one ton of adsorbent.

After the narrow boiling mixed hydrocarbon feed has been contacted with the activated carbon for a sufficient contact time to adsorb the desired proportion of normal, or essentially straight-chained hydrocarbons, and after unadsorbed hydrocarbons have been drained off, filtered, decanted, or otherwise separated from the adsorbent and adsorbed hydrocarbons, the adsorbent may be regenerated by desorption, as for instance, by contacting with about 1 to 5 volumes of a liquid wash solvent boiling within about 200° (F). of the boiling range of the feed stock treated, preferably below the boiling range of the feed stock. This wash solvent is preferably a lower boiling hydrocarbon, and preferably a branched hydrocarbon such as isopentane, isobutane, and isohexanes etc., although other low boiling hydrocarbons may be used such as normal hexane, pentane, butane, propane, or ethane. For instance, if a mixture of normal heptane and iso-octane, or other hydrocarbons boiling in a similar boiling range, have been contacted with fresh Columbia activated carbon, whereupon the normal pentane has been largely adsorbed on the carbon, and unadsorbed iso-octane has been removed, the carbon having normal pentane adsorbed thereon may be regenerated by contacting with about 3 volumes of isopentane, thereby liberating the normal heptane to form a solution thereof in isopentane while the carbon becomes charged with adsorbed isopentane. Although hydrocarbon wash liquids are preferred for economic reasons, other organic compounds such as ethers, alcohols, aldehydes, ketones, acids, amines, etc., may also be used as well as inorganic compounds such as $CO_2$, $CS_2$, $SO_2$, etc. The heptane-isopentane solution is drained or filtered off from the isopentane-carbon mixture, and is separated by distillation to yield isopentane vapor which is condensed and recycled for use in regenerating further quantities of spent adsorbent, while the liberated higher boiling hydrocarbon liquid, now relatively rich in, or consisting of, essentially straight-chained hydrocarbons, may be either used as such, or subjected to chemical treatment e. g., isomerization, reforming, catalytic cracking, etc. to convert at least a substantial portion thereof into more highly branched hydrocarbons for recycling in the present adsorption separation process.

The adsorbent which has now been freed from higher boiling straight-chained hydrocarbons, and in place thereof has been wetted by a lower boiling hydrocarbon or mixture, may then either be recycled as such and used directly for contacting further quantities of higher boiling mixed hydrocarbon feed from which it will adsorb the normal paraffins or essentially straight-chained hydrocarbons by displacement of the isopentane or other low-boiling hydrocarbon, or, if preferred, such low-boiling hydrocarbon may first be driven off from the adsorbent either by heating or by blowing with a suitable inert gas such as air, steam, methane, nitrogen, carbon dioxide, flue gas, hydrogen etc. When the adsorbent is used without removal of the wash solvent, the first filtrate collected consists of essentially pure wash solvent which may be segregated for recycling without further processing. Additional filtrate fractions contain progressively less wash solvent.

The procedure and equipment to be used in carrying out the present invention may vary according to the volume of materials to be handled and the extent of separation desired. Any of the procedures known to the art may be used. For instance, the activated carbon adsorbent may be added in comminuted e. g., powdered granules etc., form into a tank or other suitable receptacle containing the hydrocarbon liquid to be treated, and the mixture agitated for the desired contact time, then the carbon having the normal paraffins adsorbed thereon may be separated from the unadsorbed hydrocarbons by any suitable means such as by settling and decanting or filtering etc. Such a process lends itself to conversion from batch operation into continuous operation by mixing the fresh liquid and adsorbent continuously in one container for a sufficient contact time, and then either continuously filtering the mixture or separating it into charged adsorbent and unadsorbed liquid continuously in a continuous settling tank equipped with a slowly rotating, scraping blade which collects settled solids to the middle of the bottom of the tank from which they may be removed continuously in the form of a sludge or slurry by a suitable screw conveyor.

Another simple procedure adapted for either batch operation or semi-continuous operation is to percolate the fresh liquid hydrocarbon feed down through a bed of adsorbent in suitable comminuted form e. g., granules, pellets, powder, etc., until the adsorption efficiency has been reduced to a predetermined amount, at which time, if a batch process is used, the process is stopped completely for regeneration of the adsorbent, or, if semi-continuous operation is used, the fresh liquid hydrocarbon feed is switched to one or more alternate percolating tanks or towers while the charged adsorbent in the first percolation bed is regenerated, as described above, by contacting with desorption by a suitable lower boiling hydrocarbon. The process may be carried out in either fixed or moving bed adsorption equipment with the appropriate use of desorption and recycling.

Instead of carrying out the contacting of the fresh liquid and adsorbent in a single stage, several stages may be used or counter-current operation may be used in two or more stages, and either by batch or continuous operation. For instance, fresh adsorbent may continuously be fed into the top of a treating tower into the bed of which the fresh hydrocarbon liquid is fed, this passing upwardly so that unadsorbed liquid is rich in branched hydrocarbons which are continuously discharged from the top of the tower, while the descending adsorbent becomes charged with normal or essentially straight-chained hydrocarbons and is continuously withdrawn in the form of a sludge or slurry from the bottom of the tower by a screw conveyor or other suitable means.

The unadsorbed hydrocarbon liquid may thus be controlled so as to be comprised of essentially pure highly branched hydrocarbons, or in the case of a greater yield at the sacrifice of selectivity, a liquid product is obtained which is relatively much richer in highly branched hydrocarbons than the narrow boiling mixed hydrocarbon liquid before the adsorbent contacting process. The highly branched hydrocarbons thus separated according to this invention may be used not only as high anti-knock motor fuel, particularly with the addition of lead alkyl anti-knock agents, e. g., lead tetraethyl etc., or in mixed fuel compositions in blends with a suitable gasoline base stock, but they may also be used for other purposes e. g., as raw materials for conversion by chemical treatment into other chemical derivatives, or for use as special solvents etc.

If desired, the invention may be applied to the separation of mixtures containing more than 2 types of hydrocarbons. Although such a separation may be accomplished by various adsorption and desorption cycles using one adsorbent such as the activated cocoanut charcoal as described above, it has been found advantageous to use a separate adsorbent for adsorbing each specific chemical type of hydrocarbon from the mixture. For example, in the improvement of the octane number of a virgin naphtha fraction, it is desirable to remove the normal paraffins which possess low octane numbers from the iso-paraffins and aromatics in the feed stock which possess high octane numbers. Although normal paraffins may be separated from iso-paraffins by adsorption on activated carbon, it has been found that aromatics are adsorbed more strongly than the normal paraffins so that in a single adsorption operation considerable loss of aromatics occurs. It has been found that the separation desired may be accomplished by first percolating the feed stock over a fixed or moving bed of activated alumina which is selective for removing the aromatic constituents but possessing no iso-paraffin selectivity. The filtrate from the activated alumina adsorption is then contacted in either a fixed or moving bed with activated carbon which adsorbs selectively the normal paraffin. The aromatics are then desorbed from the activated alumina by any appropriate method such as steaming, washing with alcohol, water or hydrocarbon, or application of heat. This aromatic fraction is then blended with the iso-paraffin filtrate from the carbon adsorption to produce a superior fuel of high octane number. The normal paraffins adsorbed on the carbon are then desorbed by any convenient method such as steaming, heat, or washing with hydrocarbon solvent and may then be cracked, hydroformed or used as fuel.

The objects and advantages of the invention will be better understood from a consideration of the following experimental data which are given for the sake of illustration, but without intention of limiting the invention thereto.

Example 1

An equal volume of iso-octane (2,2,4-trimethyl pentane) having an octane number of 100 and of normal heptane having an octane number of 0 was filtered through a bed of Columbia activated carbon which is an activated cocoanut charcoal having the following properties:

| | |
|---|---|
| Ash content | 0.5 to 10% |
| Real density | 1.75 to 2.10 |
| Specific heat at 20 to 100° C | 0.2 cal. per g. (approx.) |
| Porosity [1] | 50 to 60% |
| Hardness [2] | 80 to 98% |
| Adsorptive capacity [3] | 50 to 90% |
| Retentive capacity [4] | 25 to 40% |
| Service life against chloropicrin [5] | 40 to 65 min. |
| Heat of wetting (with benzol) | 20 to 26 cal. per g. |
| Alkaline reaction in water. | |

This filtration was carried out in a 1" diameter tube 58" long, using 273 gms. of carbon and 262 cc. of the hydrocarbon mixture, at room temperature and atmospheric pressure. The contact time was about 1 v./v./hr. A 15% filtrate yield by volume based on the hydrocarbon feed volume, was obtained of better than 80% iso-octane purity, as determined by refractive index.

Example 2

The procedure of Example 1 was repeated except that conditions were so controlled, by feeding 312 cc. of the hydrocarbon mixture containing equal volumes of iso-octane and normal heptane, that a substantially higher filtrate yield was obtained, namely about 30 volume per cent. In this case, the filtrate had about 70% iso-octane purity.

Example 3

In another experiment the mixture of equal parts of iso-octane and normal heptane were first vaporized and then passed through a 53 inch bed of carbon containing 290 grams of carbon at 250° F. and 0.2 v./v./hr. After feeding 138 cc. of the hydrocarbon mixture, a 9% filtrate yield was obtained which contained 97% iso-octane.

Example 4

A mixture consisting of equal volumes of iso-octane and normal heptane were passed over a bed of 28-40 mesh Columbia activated carbon to produce a 20 volume percent yield of filtrate containing 69 volume percent of iso-octane. The adsorbed normal heptane rich material was then removed from the carbon by washing with 300 vols.( based on hydrocarbon feed) of isopentane. The isopentane was recovered from the normal heptane fraction by distillation. An additional portion of the 50/50 iso-octane normal heptane feed stock was then passed through the carbon without removal of the adsorbed isopentane. The first material collected in this adsorption cycle consisted of essentially pure isopentane and was segregated for use in subsequent washing steps along with isopentane recovered from the aforementioned distillation. The next fraction collected consisted of a mixture of isopentane and iso-octane rich hydrocarbon. After removal of the isopentane from this fraction by distillation, the residual hydrocarbon consisted of a mixture of normal heptane and iso-octane containing 69% iso-octane amounting to a 30 volume percent yield based on the feed stock fed into the second adsorption cycle. This adsorption, desorption cycle without intermediate complete stripping of the carbon could be repeated an indefinite number of times without deactivation of the carbon.

It is not intended that this invention be limited to the specific examples which have been given merely for the sake of illustration, but only by the appended claims in which it is intended to claim all novelty inherent in the invention and all modifications coming within the scope and spirit of the invention.

What is claimed is:

1. The process of separating normal heptane from iso-octane which comprises contacting a mixture thereof with activated cocoanut char-

---

[1] Water absorbing capacity.
[2] Chemical Warfare Service Test.
[3] Weight per cent carbon tetrachloride adsorbed at 25° C. from air saturated at 0° C.
[4] Weight per cent of carbon tetrachloride retained at 25° C. after dry air blowing for 6 hours.
[5] Chemical Warfare Service Test.

coal, using about 2 to 200 lbs. of charcoal per barrel of hydrocarbon mixture treated, at a temperature below about 285° F. for a sufficient contact time for the charcoal to adsorb a substantial proportion of the normal heptane, and separating unadsorbed liquid from the charcoal having normal heptane adsorbed thereon.

2. Process according to claim 1 followed by regeneration of the spent adsorbent by contacting it with a hydrocarbon of substantially different boiling range to desorb the normal heptane.

3. Process according to claim 1 followed by regeneration of the spent adsorbent by contacting it with a substantially lower boiling hydrocarbon to desorb the normal heptane.

4. Process according to claim 1 followed by desorption of the spent charcoal adsorbent by contacting the latter with isopentane.

5. Process according to claim 1 followed by desorption of the spent charcoal adsorbent by contacting with isopentane to desorb the normal heptane, and using the resultant charcoal wetted with isopentane for adsorbing further amounts of normal heptane from admixtures thereof with iso-octane.

6. Process according to claim 1 followed by desorption of the spent charcoal adsorbent by contacting with a substantially higher boiling hydrocarbon to desorb the normal heptane, and using the resultant charcoal wetted with higher boiling hydrocarbon for adsorbing further amounts of normal heptane from admixtures thereof with iso-octane.

7. The process of separating hydrocarbon liquids consisting substantially of straight-chained paraffin hydrocarbons and highly branched paraffin hydrocarbons containing from three to twelve carbon atoms per molecule and having a boiling point spread of less than about 140° F., which comprises contacting said mixture with activated cocoanut charcoal using at least about 2 lbs. per barrel of liquid treated to selectively adsorb the substantially straight-chained paraffin hydrocarbon, and separating from the charged adsorbent a fraction substantially richer in more highly branched paraffin hydrocarbons than the original hydrocarbon feed mixture.

8. The process which comprises fractionating an alkylate composed of paraffins containing from three to twelve carbon atoms per molecule by distillation into fractions having a spread of less than about 100° F., in boiling point, contacting at least one of said narrow boiling fractions with activated cocoanut charcoal to adsorb thereon the more straight-chained constituents thereof and separating from the charged adsorbent a fraction substantially richer in more highly branched hydrocarbons than the original feed mixture.

9. Process according to claim 8 which comprises contacting a plurality of narrow boiling paraffin alkylate fractions containing from three to twelve carbon atoms per molecule separately with activated cocoanut charcoal to adsorb thereon the relatively more straight-chained hydrocarbons, and separating from the several charged adsorbents fractions relatively richer in high branched hydrocarbons, combining at least two of these resultant highly branched hydrocarbon fractions and using the resultant mixture of highly branched hydrocarbons for fueling an internal combustion engine.

10. The process for separating normal paraffins from branched chained paraffins in a mixture of said paraffins containing from six to ten carbon atoms per molecule, said mixture being substantially free from other kinds of hydrocarbons which comprises passing said mixture into contact with a sufficient quantity of activated cocoanut charcoal to preferentially adsorb the normal paraffins from the mixture by the said charcoal and withdrawing from the charcoal residual unadsorbed paraffins which are mainly branched chained paraffins.

11. The process according to claim 10 in which the normal paraffins adsorbed by the charcoal are desorbed by washing the said charcoal with a lower boiling branched chained paraffin solvent.

HENRY J. HIBSHMAN.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,376,425 | Frey | May 22, 1945 |
| 1,412,954 | Mittasch | Apr. 18, 1922 |
| 1,872,080 | Harris | Aug. 16, 1932 |
| 1,678,298 | Patrick et al | July 24, 1928 |

FOREIGN PATENTS

| Number | Country | Date |
|---|---|---|
| 208,569 | Great Britain | Dec. 20, 1923 |
| 205,868 | Great Britain | Oct. 22, 1923 |